(12) United States Patent  (10) Patent No.: US 7,647,894 B2
Axelrod et al.  (45) Date of Patent: Jan. 19, 2010

(54) TREAT HOLDER FOR PETS

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 254 days.

(21) Appl. No.: 11/215,741

(22) Filed: Aug. 30, 2005

(65) Prior Publication Data

US 2007/0044730 A1 Mar. 1, 2007

(51) Int. Cl.
*A01K 29/00* (2006.01)
(52) U.S. Cl. ................ 119/711; 119/51.01; 119/709
(58) Field of Classification Search ............. 119/702, 119/707, 708, 709, 710, 711, 51.01; D30/160
See application file for complete search history.

(56) References Cited

U.S. PATENT DOCUMENTS

| 5,476,069 | A |   | 12/1995 | Axelrod ............... 119/709 |
| 5,538,456 | A | * | 7/1996  | Liu et al. ............. 446/473 |
| 5,819,690 | A | * | 10/1998 | Brown ................. 119/707 |
| 5,827,565 | A |   | 10/1998 | Axelrod ............... 426/623 |
| 5,941,197 | A |   | 8/1999  | Axelrod ............... 119/710 |
| 6,067,941 | A |   | 5/2000  | Axelrod ............... 119/707 |
| 6,093,427 | A |   | 7/2000  | Axelrod ............... 426/104 |
| 6,093,441 | A |   | 7/2000  | Axelrod ............... 426/632 |
| 6,098,571 | A |   | 8/2000  | Axelrod et al. ........ 119/707 |
| 6,110,521 | A |   | 8/2000  | Axelrod ............... 426/549 |
| H1871     | H |   | 10/2000 | Majumdar ............. 152/524 |
| 6,126,978 | A |   | 10/2000 | Axelrod ............... 426/285 |
| 6,159,516 | A |   | 12/2000 | Axelrod et al. ........ 426/456 |
| 6,180,161 | B1 |  | 1/2001  | Axelrod ............... 426/623 |
| 6,186,096 | B1 | * | 2/2001 | Miller ................ 119/709 |
| 6,274,182 | B1 |  | 8/2001  | Axelrod et al. ........ 426/132 |
| 6,586,027 | B2 |  | 7/2003  | Axelrod et al. ........ 426/132 |
| 2005/0042339 | A1 | | 2/2005 | Axelrod ............... 426/132 |
| 2005/0045115 | A1 | * | 3/2005 | Mann ................. 119/711 |

OTHER PUBLICATIONS

MatWeb —Online Material Data Sheet; http://www.matweb.com/search/SpecificMaterialPrint.asp?bassnum=P0RUB1; Title: Natural Rubber, Vulcanized (NR, IR, Polyisoprene); downloaded Aug. 19, 2005; 2 pgs.
NPL (National Physical Laboratory) http://www.npl.co.uk/materials/programmes/mpp/cotposm.html; Title: The UK's National Measurement Laboratory: Characterisation of the properties of soft materials; downloaded Aug. 19, 2005; 3 pgs.

(Continued)

*Primary Examiner*—Trinh T. Nguyen
(74) *Attorney, Agent, or Firm*—Grossman, Tucker, Perreault & Pfleger, PLLC

(57) ABSTRACT

A holder for dog chews and pet treats is provided, comprising a molded hollow body shape including a plurality of openings. Inserts may be included in the openings which may be of a lower durometer or thinner cross-section than the thickness of the body. Pet treats such as dog chews and the like may be inserted into the inserts to be frictionally retained therein for enjoyment by an animal.

9 Claims, 3 Drawing Sheets

OTHER PUBLICATIONS http://www.jameswalker.biz/group/products/commercial_white_natural_rubber_259c.html (1 pg).

Molded Dimensions —Engineered Elastomer Solutions Design & application Guide downloaded Aug. 19, 2005; http://www.molded-dimensions.com/urethanescompression.htm (5 pgs).

U.S. Appl. No. 10/873,941, filed Jun. 22, 2004, Axelrod.

Compression Set Test For Rubber/Lauren Manufacturing Company; "Determining Design applicability" downloaded Aug. 19, 2005: http://www.lauren.com/Technical_Info/compression_set_test.asp (4 pgs).

Tinius/Technical Support: Clash-Berg Test: downloaded Aug. 19, 2005 (1 pg) http://www.tiniusolsen.com/tmech2.html.

Appliance Design: Elastomers, Gaskets & Seals: Hard Facts about Soft Touch; downloaded Aug. 19, 2005 http://www.ammagazine.com/CDA/ArticleInformation/coverstory/BNPCoverStoryItem/0, . . . (5 pgs).

Vulcanization —Wikipedia, the free encyclopedia; downloaded Jul. 26, 2005 (4 pgs) http://en.wikipedia.org/wiki/Vulcanization.

Vulcanization —The Columbia Encyclopedia, Sixth Edition. 2001-05 (2 pgs) downloaded Jul. 26, 2005 http://www.bartleby.com/65/vu/vulcaniz.html.

Sil-pad,gap pad, hi-flow thermal interface materials/home; The Bergquist Company Thermal Materials: Gap-Pad Products; downloaded Jul. 29, 2005 (3 pgs) http://www.bergquistcompany.com/tm_gap_pad_detail.cfm?oid=11023&tab=faqs&prod_gappad.

Elastomers & Rubbers 1.3: Nonoil-resistant rubbers; downloaded Jul. 22, 2005 (3 pgs) http://www.machinedesign.com/BDE/materials/bdemat4/rvmat3c.html.

* cited by examiner

TREAT HOLDER FOR PETS

FIELD OF THE INVENTION

This invention relates to molded pet toys and, more particularly, to a molded dog toy which includes inserts for holding pet treats.

BACKGROUND OF THE INVENTION

Most dogs enjoy chewing on things, although preferences vary as to the hardness of the substances favored. Some dogs like to chew on very hard materials such as cow bones, wood and nylon, while others prefer softer chews such as polyurethane or rubber. Still others favor freeze dried snacks. Some dogs, due to their age, may not be able to chew on very hard substances. Young dogs may have insufficiently developed teeth, while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof may have an adverse effect on the dog's digestion and may become impacted in the dog's intestinal tract with life-threatening consequences. Other edible dog chews have been marketed which have a comparatively short shelf-life and therefore must be replaced by retail outlets at frequent intervals. Yet other prior art dog chews are lacking in structural integrity whereby they are susceptible to breakage during handling and shipping.

Attention is directed to the following United States Patents and copending applications, commonly owned by the assignee of the present invention and included herein by reference: U.S. Pat. No. 5,476,069; U.S. Pat. No. 6,093,427, entitled "Vegetable Based Dog Chew"; U.S. Pat. No. 5,827,565, entitled "Edible Dog Chew"; U.S. Pat. No. 5,941,197, entitled "Carrot-Based Dog Chew"; U.S. Pat. No. 6,180,161, filed Jul. 14, 1998, entitled "Heat Modifiable Edible Dog Chew"; U.S. Pat. No. 6,126,978, entitled "Improved Edible Dog Chew"; U.S. Pat. No. 6,110,521, entitled "Wheat & Casein Dog Chew With Modifiable Texture"; U.S. Pat. No. 6,093,441, entitled "Heat Modifiable Peanut Dog Chew"; U.S. Pat. No. 6,159,516, entitled "Method of Molding Edible Starch"; U.S. Pat. No. 6,586,027, entitled "Health Chew Toy"; U.S. Pat. No. 6,274,182, entitled "Animal Chew"; U.S. Pat. No. 6,067,941, entitled "Animal Chew"; U.S. Pat. No. 6,098,571, entitled "Treat Dispensing Toy"; U.S. application Ser. No. 10/643,168, entitled "Animal Chew Containing Hard And Soft Chewing Surfaces"; and U.S. application Ser. No. 10/873,941, entitled "Collapsible Pet Treat".

SUMMARY OF THE INVENTION

An exemplary embodiment of the present invention relates to a hollow body member including a side wall, wherein the sidewall includes at least one opening and at least one insert may engage with the opening. The body member may include a first cross-sectional thickness and the at least one insert may include a second cross-sectional thickness, wherein the first cross-sectional thickness is greater than the second cross-sectional thickness. In addition, or alternatively to varying cross-sectional thicknesses, the body member may include a first Shore hardness and the at least one insert may include a second Shore hardness, wherein the first Shore hardness is greater than the second Shore hardness.

DETAILED DESCRIPTION

Figure 1A:
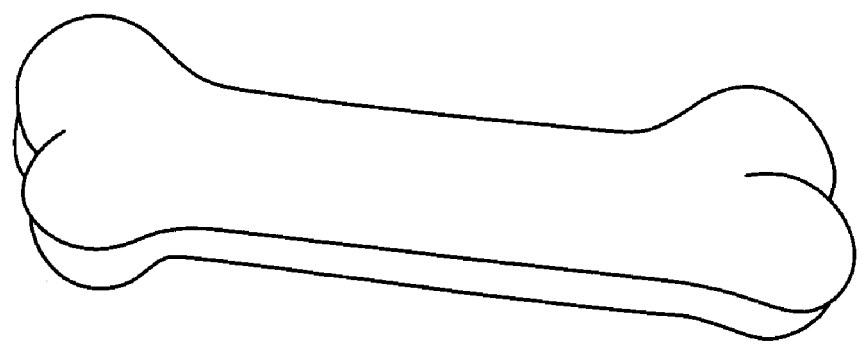
FIG. 1 is a perspective view of three different exemplary dog chews or treats; A, B, and C.
Figure 1B:
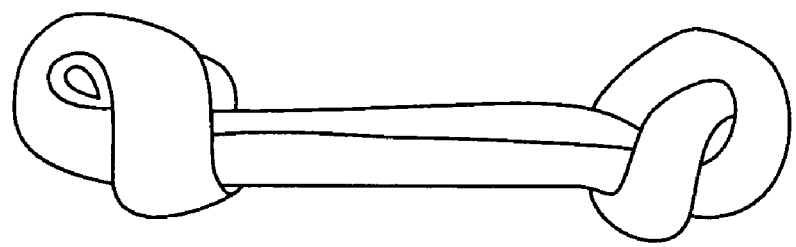
Figure 1C:
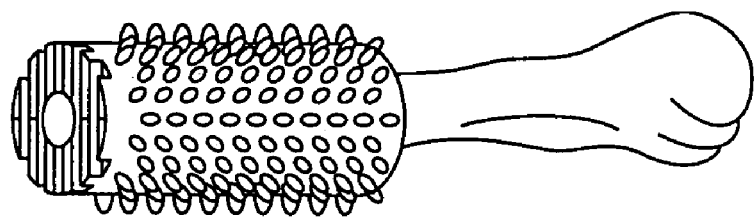

FIG. 1 illustrates three different exemplary and non-limiting shapes of potentially edible or chewable products for an animal. (A) is a perspective view of a molded plastic treat in the shape of a dog bone, which may have a smooth lower surface and textured upper surface. (B) is a perspective view of a rawhide "dog bone" which may comprise a strip which have been formed into a knot at each end. (C) represents a green colored edible dental brush chew product for a dog which is sold under the NUTRI DENT®trademark by T.F.H. Publications, Inc.

As can be seen, the above shapes have a relatively smaller cross-sectional portion near the center and bulbous ends which may allow the dog to pick up the treat. However, the dog may prefer to prop up one end of the treat on a paw or on another raised surface in order to get the toy in a position along the dog's jaw for additional chewing and enjoyment. Especially when partially consumed, a small or short portion of the length of such a treat or dog chew may be difficult for the dog to position vertically. The present invention may therefore allow the pet treat or dog chew to be insertable in, and difficult to remove from, a treat holder.

Figure 4:
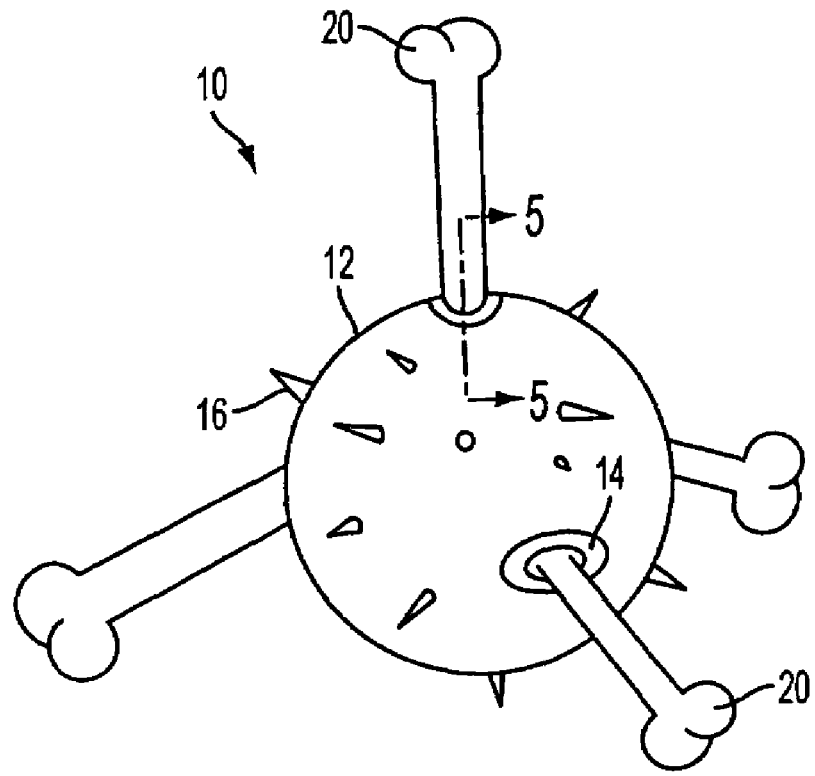
FIG. 4 is a perspective view of a treat holder according to the present invention, including pet treats retained in the inserted cup-shaped inserts.

FIG. 4 is a perspective view of one exemplary and non-limiting illustration of the present invention. In this embodiment, the pet treat holder 10 of the present invention comprises a body member 12 in the shape of a hollow ball molded to include a plurality of openings into which exemplary cup-shaped inserts 14 have been secured. The cup-shaped inserts 14 are capable of receiving and retaining pet treats 20, dog chews, etc. such as are shown in FIG. 1.

The pet treats may comprise any combination of shapes, compositions, flavors, scents, etc. to provide the animal with variety in enjoying the toy. Further, with this particular exemplary embodiment, it is relatively easy to exchange the treats to provide variety in treat characteristics such as hardness (which may effect the chewing action of the animal) flavor, vitamins or nutrients, shape and size. For example, the components may comprise starch, rawhide, or any other edible material so that the components that may be consumed by the animal can be replaced.

The hollow ball 12 may be molded of a rubber or plastic having a first durometer hardness such that the ball may be enjoyed in play by a dog or like animal. The ball 12 may include a plurality of projections 16 which extend from the outer surface to aid in cleaning the dog's teeth and to provide a random path when bounced to encourage the dog in fetching the ball. The cup-shaped inserts 14 may be molded separately of a second, relatively lower durometer rubber or plastic than the ball. The inserts (see FIGS. 2 and 3) may fit into complementary openings in the outer wall of the ball 12 and may project inwardly. The inner periphery of the cup-shaped insert may be contoured to approximately match the bulbous end portion of the pet treats shown in FIG. 1. Accordingly, when the treat 20 is inserted into the insert 14, the treat 20 may expand the periphery and somewhat compress the sidewalls of the insert against the sidewall 19 of the ball (see FIG. 3) to ensure retention of the treat 20 through surface friction.

In addition, the use of a low durometer rubber or plastic for the insert 14, preferably less than or equal to about 45 Shore A, may provide additional surface compliance or conformability between the relatively harder surface of the treat and relatively softer surface of the insert. The insert 14 may also be of a different color from the ball 12 as well as one from another.

The ball 12 or treat holder may comprise any plastic or rubber suitable for safe interaction with an animal such as a dog. Preferably, the treat holder comprises an elastomeric material which may provide the durability required for longevity. More particularly, the ball 12 and inserts 14 may comprise natural rubber, sourced from cis-1,4-polyisoprene or even trans-1,4-polyisoprene, as well as synthetic natural rubber such as styrene-butadiene rubber (SBR), or a blend of synthetic and natural rubber with other polymers, such as ethylene-propylene rubber (EPR) or polymers formed from ethylene-propylene in combination with diene monomers (EPDM). The durometer of the treat holder 12 may therefore be equal to or greater than about 45 Shore A.

While relatively low durometer polymers possess a surface tack or an ability to engage and grip in a manner that may aid in retaining a pet treat in an insert, as with the present invention, lower durometer vulcanized natural rubber may also possess a surface topography that provides even greater natural adhesion (reduced slip and improved tack). Natural rubber that has been vulcanized with sulfur is also preferred because of the improved dynamic properties that it may possess as a consequence of sulfur crosslinks. Natural rubber may also possess superior tear strength to other elastomeric polymers and be preferred for animal toys that may themselves be chewed upon.

In a second embodiment, the invention is directed at inserts, such as cup-shaped inserts, which may be molded of the same rubber or plastic as the body member or holder but which may be thinner in cross-section than the holder. This thinner cross-section may allow improved compliance of the insert to the treat due to the reduced section modulus. That is, due to the fact that the insert may have a thinner cross-sectional wall, relative to the holder, the insert may conform and may be relatively more flexible to accommodate a treat. Preferably, the inserts and holder may both be molded of natural rubber. However, as alluded to, it is particularly advantageous to provide inserts of natural rubber due to its natural ability to engage and retain the pet treat.

Figure 2:
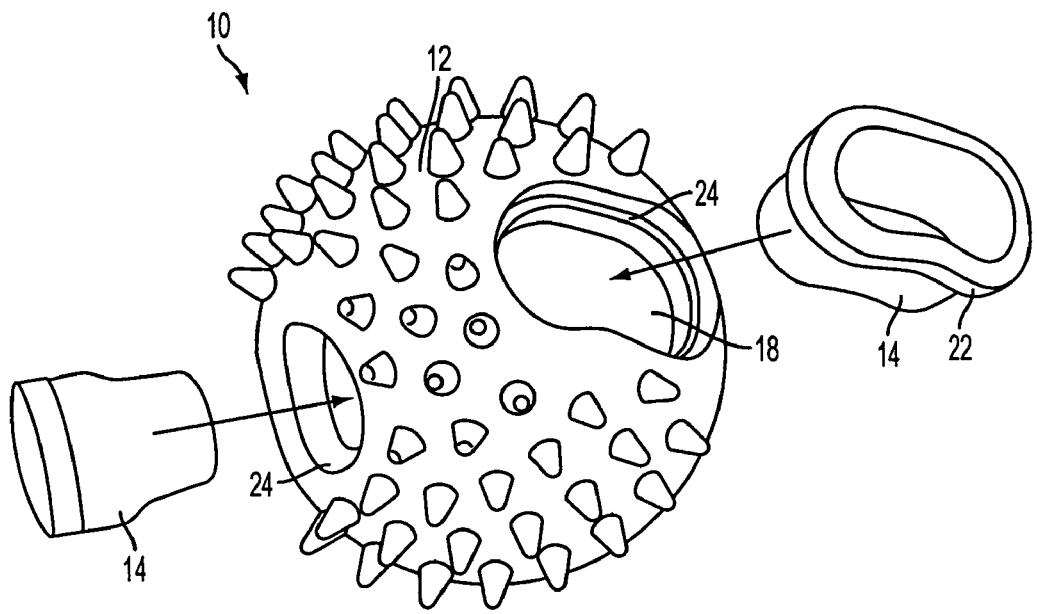
FIG. 2 is a perspective view of an exemplary treat holder according to the present invention.

FIG. 2 is an exploded perspective view of the components of the present invention. A treat holder 10, in the exemplary view as a body member 12 in the shape of a hollow ball, may be molded of a rubber or plastic, preferably in two halves and may be joined together by an adhesive. The holder may include a plurality of openings 18 which are sized to receive cup-shaped inserts 14 having an outer periphery which may be complimentary in shape to the openings. The exemplary cup-shaped inserts preferably may have a flange 22 that preferably matches the shape of, and engages with, a land area 24 cut into the periphery of the opening 18 at the outer surface of the ball 12 which may aid in locating the insert 14 in the base or ball 12. As shown in FIG. 2, the inserts 14 may have an inner surface shaped to assist in receiving and retaining pet treats, as shown in FIG. 1, which have knuckled ends (for instance, in the shape of a kidney, or a peanut shell or double-lobed).

Figure 3:
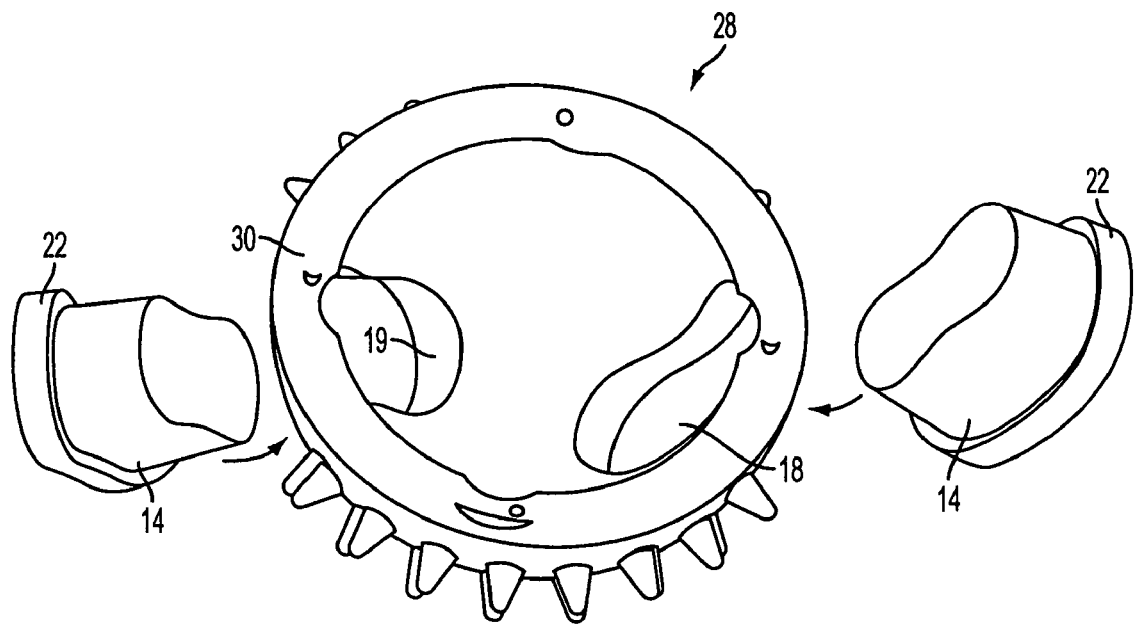
FIG. 3 is a backside perspective view of one of the molded halves of the exemplary treat holder of FIG. 2, according to the present invention.

FIG. 3 is a perspective view of the exemplary pet treat holder of FIG. 2 illustrating the backside of one of the molded halves 28 of the ball 12. Locating features to aid in accurate positioning of the two halves of the ball may comprise pins 30 which engage complimentary holes in the wall of the opposing half of the ball (not shown). Rather than pins, projecting ribs which conform with the outer shape of the holder may engage matching depressions in the opposite half of the holder.

The two halves of the exemplary ball 12 may be adhered in place by use of a suitable adhesive, as may be the inserts 14 into the base 12. The joining of the halves and inserts may also take place during the molding process as well, without the need for external adhesives, by placing the inserts in the mold cavity for the holder and over-molding or insert-molding. In addition, it is contemplated that each half of the holder may include the inserts, of reduced cross-section, formed in a single step with the holder half, rather than formed separately and attached later. In other words, the holder half including the "inserts" may be of unitary construction and the grip or tack of the "insert" may be the result of the thinner more compliant cross-section of the "insert."

While the exemplary embodiment described heretofore uses a ball 12 as the base for the pet holder according to the present invention, any shape that may be molded is contemplated. This includes the use of relatively lower durometer inserts which may frictionally and releasably retain a pet treat. Preferably, these shapes may include relatively similar sized faces to permit rolling and playing with the holder when it does not include pet treats. Such shapes may include but not be limited to spheres, cylinders, cones, ellipsoids or polyhedra.

Figure 5:
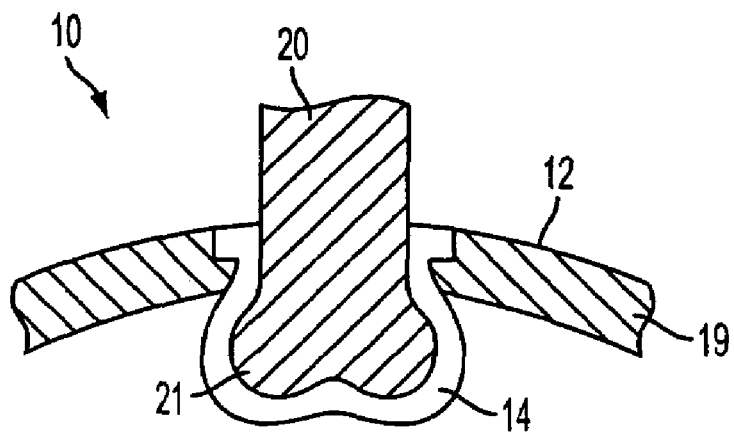
FIG. 5 is a cross-sectional view through the pet treat, insert and holder of FIG. 4 taken along lines 5-5.

The body member 12 may preferably be hollow to provide a toy that may be more easily chewed upon and safer to throw, etc. By employing a hollow design the base may provide additional retention of the treat. In other words, it may be possible for the bulbous end of the treat to insert beyond the depth of wall 19. When the bulbous end portion then expands the side walls of insert 14, at a region beyond the depth of wall 19, the bulbous region may become "locked" against the inside surface of the body member 12. This is illustrated in FIG. 5 which is a sectional view of FIG. 4 taken along lines 5-5. As shown, a pet treat 20 may be retained in an insert 14 which fits in an opening in a hollow ball 12, the hollow ball acting as a holder 10. The treat 20 generally may have a bulbous end 21 which is gripped by the insert 14 and which may expand the insert and the opening in the wall 19 of the ball 12. The bulbous end may extend towards the center of the ball 12 such that the end 21 and the expanded walls of the insert 14 may lie within the hollow space of the ball 12 and form a mechanical interference with the wall. This may provide additional retention of the treat in the holder. The cross-sectional thickness of body member 12, may be thicker than the cross-sectional thickness of insert 14. The reduced cross-section thickness of the insert 14 may provide for increased flexibility and expansion as compared the body member 12.

Accordingly, an improved pet toy or dog treat holder may be molded to include one or a plurality of inserts, providing a surface with natural tack which may receive one or more pet chews or treats and which may retain such for ease of access and enjoyment by an animal. The chews or treats may include separately molded shapes optionally prepared from different compositions or flavors that can be engaged into the portions of the base or holder. The inserts in the holder may be molded of a lower durometer rubber or plastic, or of a thinner cross-sectional wall thickness than the body of the holder, wherein the inserts are capable of retaining the treat due to the grip or tack of the rubber or plastic. In addition, the chews or treats may be engaged with the insert and then against the inside surface of the body member.

In conclusion, therefore, it is seen that the present invention and the embodiments disclosed herein and those covered by the appended claims are well adapted to carry out the objectives and obtain the goals set forth. Certain changes can be made in the subject matter without departing from the spirit and scope of the invention. It is realized that changes are possible within the scope of this invention and it is further intended that each element or step recited in any of the following claims is to be understood as referring to all equivalent elements or steps. The following claims are therefore intended to cover the invention as broadly as legally possible in whatever form it may be utilized.

What is claimed is:

1. A holder for a pet treat or chew comprising:
   a first hollow body member in the shape of one half of a ball including a first sidewall, wherein said first sidewall includes a first at least one opening including a first land area in the inner periphery of said first opening and wherein said first body member has a first Shore hardness and a first cross-sectional thickness;
   a second hollow body member in the complementary shape of the other half of said ball including a second sidewall, wherein said second sidewall includes a second at least one opening including a second land area in the inner periphery of said second opening and has said first Shore hardness and said first cross-sectional thickness;
   adhesive to adhere said first hollow body member and said second hollow body member;
   locating features in the form of pins in said first sidewall and complementary holes in said second sidewall aid in positioning of said first hollow body to said second hollow body to form said holder; and
   at least two cup-shaped inserts having walls, said walls engaging with said inner periphery of each of said first and second at least one opening and projecting inwardly such that a portion of said walls lie within the hollow space of said holder, each of said cup-shaped inserts having only a single opening and a flange surrounding said opening, wherein said flange matches the shape of and engages with each of said land area areas, said inserts having a second Shore hardness and a second cross-sectional thickness,
   wherein said second Shore hardness is less than said first Shore hardness and said first cross-sectional thickness is greater than said second cross-sectional thickness, and wherein said walls of said inserts expand upon insertion of said pet treat and compress the sidewalls of said inserts against the sidewall of said hollow body members.

2. The holder of claim 1, wherein said body member and said at least two inserts comprise polyisoprene rubber.

3. The holder of claim 1, wherein said second Shore hardness is 45 Shore A or less.

4. The holder of claim 2, wherein said at least two inserts comprises natural rubber.

5. The holder of claim 2, including said pet treat wherein said pet treat is frictionally engaged by said polyisoprene rubber.

6. The holder of claim 1, wherein each of said first and second hollow body members includes a plurality of openings in said sidewall and a plurality of inserts engage with said plurality of openings and wherein said plurality of inserts comprise different colors.

7. The holder of claim 1, wherein said ball is round.

8. The holder of claim 1, wherein each of said at least two inserts is attached to each of said body members in each of said openings by said adhesive.

9. The holder of claim 1, wherein the treat is retained by a mechanical interference with each of said at least two cup-shaped inserts against said sidewalls.

* * * * *